Nov. 5, 1929.  A. BRÜNINGHAUS  1,734,793
BEARING ADJUSTING MEANS FOR ROLLER MILLS
Filed Dec. 20, 1927
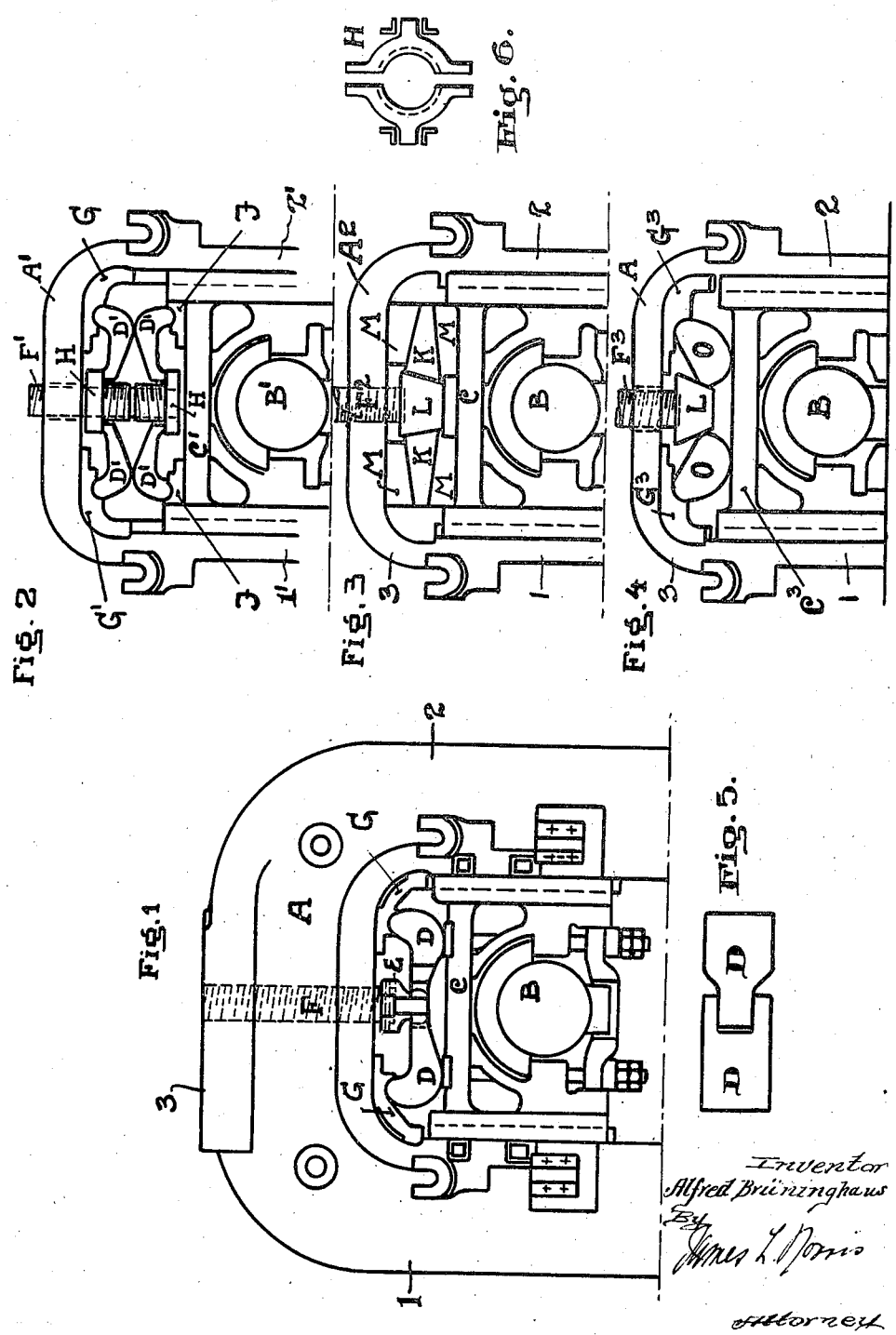

Patented Nov. 5, 1929

1,734,793

UNITED STATES PATENT OFFICE

ALFRED BRÜNINGHAUS, OF DORTMUND, GERMANY

BEARING-ADJUSTING MEANS FOR ROLLER MILLS

Application filed December 20, 1927, Serial No. 241,409, and in Germany October 23, 1926.

The invention relates to improvements in devices for discharging the pressure-spindles on rolling-mills and reducing the end-play of these spindles.

In rolling-mills the pressure-spindle or the nut carried by the framing traverse in which such spindle works is subject to considerable wear which makes itself felt in the form of end-play of the pressure spindle, when adjusting the top-roll. This produces a most detrimental effect upon the rolling-process and therefore upon the products. In order that the spindle may be capable of taking up the pressure of the roll, it must be of very large dimensions, which in turn requires framing traverses of corresponding size. The force of the spindle, positioned in the centre of the framing traverse, acts unfavourably upon the latter, by reason of which the framing traverse must be of extremely solid construction.

These disadvantages are obviated by the device of the present invention, of which examples are shown in the drawing wherein:

Figure 1 is an end view of a pressure roll standard embodying the invention and Figures 2, 3 and 4 are views similar to Figure 1 showing modified forms of the invention.

Figure 5 is a top plan view of the knee or cam levers shown in Figure 1, and Figure 6 is a top plan view of one of the spindle engaging nuts shown in Figure 2.

In Fig. 1, A represents the standard for the rolls comprising a pair of end members 1 and 2 and a transverse member 3, B the rolling journal positioned in the sliding bar C. D are two levers of a special knee or cam shape having their inner ends pivoted together and to the lower end E of the spindle F and their outer ends widened and provided with portions curved on different radii and with such curved portions bearing against the frame C and the bearings G of the standard, so that they are permitted to swing to exert a cam-like action between the frame C and the standard. Accordingly the upward movement of the spindle F in the standard A acts upon the frame according to the ratio of transmission of such movement to the frame through the cam-like action of the levers D. For instance, if the distance between the point of contact of a lever D with the sliding bar C and the center of the spindle F is three times the distance between the point of contact of the lever D with the sliding bar C and the center of motion of the lever D, i. e., if the ratio of transmission equals 1:4, the movement of the spindle F of 4 cm. would entail a movement of the sliding bar of only 1 cm.

Consequently the sliding bar and the top-roll show only one quarter of the end-play of the spindle. The pressure of the top-roll is transferred to the spindle in accordance with the ratio of transmission and therefore is very small, whilst the main-pressure is transferred by the bearing G directly to the standard. The low load on the spindle reduces naturally the wear of the thread of the spindle, and therefore the spindle may be of smaller dimensions than usual.

In Fig. 2, A' represents the rolling standard comprising end members 1' and 2' and a transverse member 3', B' the rolling journal, and C' the sliding bar. D' are knee-shaped levers arranged in opposed pairs between upper bearings G' on the transverse member 3' of the standing and lower bearings J on the sliding bar C', and F' is the pressure-spindle. The spindle, instead of being screw-threaded in the transverse member of the standard G', has no endwise movement but only rotates in said transverse member. The spindle is provided at its lower end with right- and left-handed threads to engage right- and left-handed nuts H. These nuts are of the split-type and provided with lateral guides, as shown in Fig. 6, to hold them against rotary movement. If the spindle is rotated in one direction, one of the nuts H is moved upwards and the other downwards. If the movement of the spindle is reversed, the nuts will naturally move in an opposite direction. When the nuts are moved toward one another the upper nut will bear against the inner ends of the upper levers D' and move same downwardly, and the lower nut H' will bear against the inner ends of the lower levers and move same upwardly to cause the levers D' to swing upon each other.

This will transfer almost all of the rolling pressure directly to the bearings G', i. e. to the standard; the spindle is relieved of considerable end pressure and the inconsiderable wear of the nuts and a corresponding minimum end-play of the spindle will not make itself felt owing to the favourable ratio of transmission. Therefore, the small end-play has little effect upon the top-roll or the rolling products.

In Fig. 3, $A^2$ represents the rolling standard comprising end members $1^2$ and $2^2$ and a transverse member $3^2$, $F^2$ the pressure spindle threaded in the transverse member of the standard and pressing against a wedge L mounted between the inner inclined faces of the wedges K which, in turn, are mounted between wedges M. By a suitable form of the various wedges it is possible to transfer the pressure of the roll almost directly to the standard and only a very small part of such pressure is taken up by the spindle. The spindle is, therefore, almost totally relieved of end pressure and only a trifling fraction of the end-play of the spindle that may possibly exist will be noticeable.

In Fig. 4, the wedge L' presses, if the spindle $F^3$ is moved toward the sliding bar C, between two pressure-pieces O having curved faces of different radii and bearing, respectively, against the bearings $G^3$ and the sliding bar $C^3$. The pressure of the roll is transferred by the pressure-pieces O to the standard and to the spindle in accordance with the ratio of transmission. The spindle is thus relieved of considerable end pressure and the end-play of the spindle is almost entirely neutralized.

I claim:

1. Means for relieving the pressure-spindles of rolling-mills of end pressure and reducing the end-play of such spindles, comprising a standard including a pair of end members and a transverse member connecting said end members, a bar sliding between said end members, a bearing for the rolling journal supported by said bar, a single spindle working in the transverse member of the standard for adjusting the sliding bar, and power multiplying means between the spindle, the transverse member of the standard and the sliding bar.

2. In a device for relieving the pressure-spindles on rolling-mills of end pressure and reducing the end-play of such spindles, comprising a standard, a bar sliding within the standard, a bearing for the rolling journal supported by said bar, a spindle for adjusting the sliding bar, two curved coacting levers having their ends operable by the spindle and the standard, and each having a rolling fulcrum with the sliding bar.

3. The combination according to claim 1 in which the power-multiplying means includes a pair of levers operably connected to the spindle and the bar and standard.

4. The combination according to claim 1 in which the power-multiplying means includes two nuts connected by right- and left-hand threads to the spindle, and a pair of levers each having one end connected to one of said nuts for movement to or from each other, one of said levers having its opposite end bearing against the standard and the other lever having its opposite end bearing against the bar, the intermediate portions of said levers being fulcrumed upon the other.

In testimony whereof I have hereunto set my hand.

ALFRED BRÜNINGHAUS.